United States Patent
Lee et al.

(10) Patent No.: US 12,385,431 B2
(45) Date of Patent: Aug. 12, 2025

(54) INDUSTRIAL PREMIXED GAS COMBUSTOR USING INTERNAL EXHAUST GAS RECIRCULATION AND OPERATING METHOD THEREOF

(71) Applicant: KOREA INSTITUTE OF ENERGY RESEARCH, Daejeon (KR)

(72) Inventors: Min-Jung Lee, Daejeon (KR); Young-tae Guahk, Seoul (KR); Chang-bog Ko, Daejeon (KR); Eun-kyung Lee, Sejong (KR); Dae Keun Lee, Daejeon (KR); Seung-gon Kim, Daejeon (KR); Woo-Nam Jung, Daejeon (KR); Hookyung Lee, Sejong (KR); Dong Myung Seo, Cheonan-si (KR); Nam Su Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 18/571,617

(22) PCT Filed: Dec. 13, 2022

(86) PCT No.: PCT/KR2022/020182
§ 371 (c)(1),
(2) Date: Dec. 18, 2023

(87) PCT Pub. No.: WO2023/121107
PCT Pub. Date: Jun. 29, 2023

(65) Prior Publication Data
US 2024/0288157 A1    Aug. 29, 2024

(30) Foreign Application Priority Data
Dec. 22, 2021 (KR) .................. 10-2021-0185429

(51) Int. Cl.
*F02C 3/34* (2006.01)
*F23R 3/28* (2006.01)
*F23R 3/34* (2006.01)

(52) U.S. Cl.
CPC ............ *F02C 3/34* (2013.01); *F23R 3/286* (2013.01); *F23R 3/343* (2013.01)

(58) Field of Classification Search
CPC .. F23R 3/34; F23R 3/286; F23R 3/343; F23R 3/346; F23R 3/36; F23C 9/006; F02C 3/34
See application file for complete search history.

(56) References Cited

U.S. PATENT DOCUMENTS 3,174,526 A * 3/1965 Von Linde ............ F23C 9/006
431/116
5,044,932 A * 9/1991 Martin .................. F23C 9/006
431/9

(Continued)

FOREIGN PATENT DOCUMENTS

JP     2008-249245 A    10/2008
KR    10-0481431 B1     4/2005

(Continued)

*Primary Examiner* — William H Rodriguez
(74) *Attorney, Agent, or Firm* — Birch, Stewart, Kolasch & Birch, LLP

(57) ABSTRACT

The present disclosure relates to relates to an industrial premixed gas combustor using internal exhaust gas recirculation and an operating method thereof. Particularly, the industrial premixed gas combustor using internal exhaust gas recirculation includes: a fuel chamber that is provided in the central part of the interior of an injection block surrounded with an output end of the oxidizer supply chamber; an injection block that has a plurality of injection channels where oxidizers are introduced from the oxidizer supply chamber 10 and fuel and the oxidizers are mixed and injected; an orifice for fuel injection that is provided in- (Continued)

between the fuel chamber of the injection block and each of the injection channels, and injects fuel inside the fuel chamber to the injection block; and an internal recirculation tube that is formed to be spaced apart from the outer surface of the output end of the oxidizer supply chamber at a predetermined interval and to extend toward the outlet, and recirculates exhaust gas due to combustion.

7 Claims, 6 Drawing Sheets

(56) References Cited

U.S. PATENT DOCUMENTS

| | | | | |
|---|---|---|---|---|
| 5,240,409 A * | 8/1993 | Xiong | ............ | B01F 25/3131 |
| | | | | 431/189 |
| 5,292,244 A * | 3/1994 | Xiong | ............ | B01F 25/3131 |
| | | | | 431/189 |
| 5,350,293 A * | 9/1994 | Khinkis | ............ | F23C 6/045 |
| | | | | 431/9 |
| 11,732,886 B2 * | 8/2023 | Taylor | ............ | F23D 11/402 |
| | | | | 431/2 |
| 2022/0163197 A1 * | 5/2022 | Taylor | ............ | F23D 14/64 |

FOREIGN PATENT DOCUMENTS

| | | |
|---|---|---|
| KR | 10-1110144 B1 | 2/2012 |
| KR | 10-1738946 B1 | 5/2017 |
| KR | 10-2014828 B1 | 8/2019 |
| KR | 10-2437328 B1 | 8/2022 |

* cited by examiner

[FIG. 1]
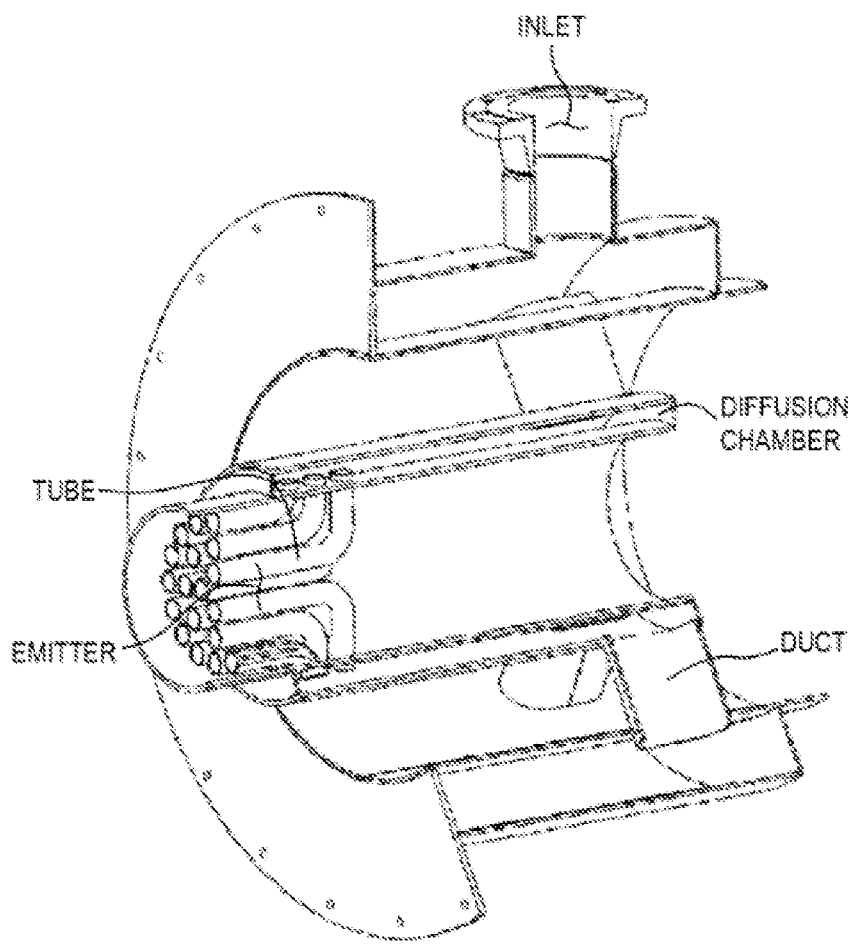
PRIOR ART 1

[FIG. 2]
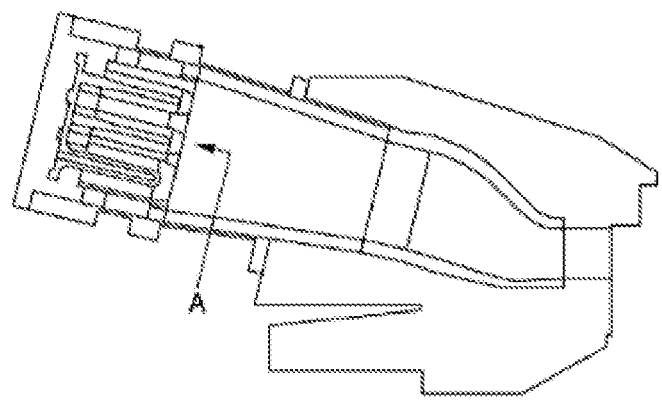
(a)
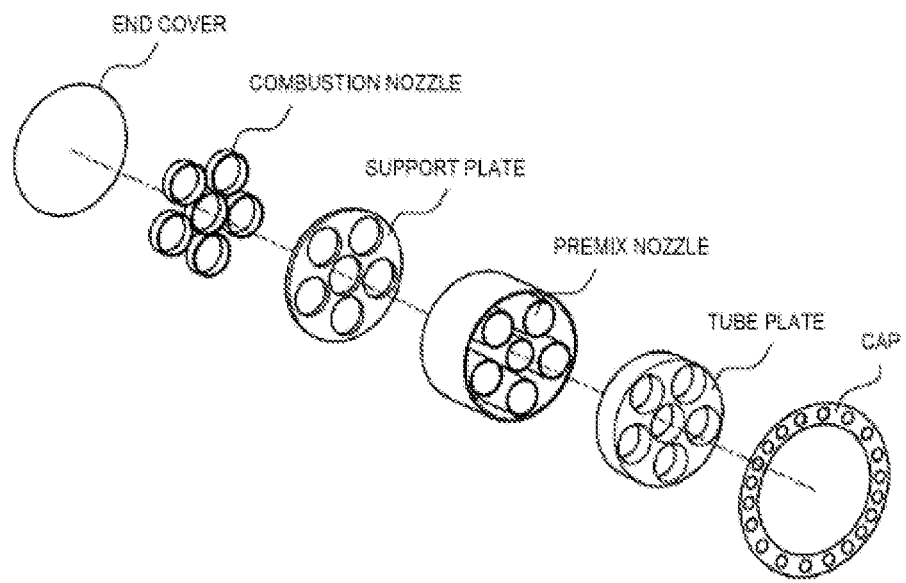
(b)
PRIOR ART 2

[FIG. 3]
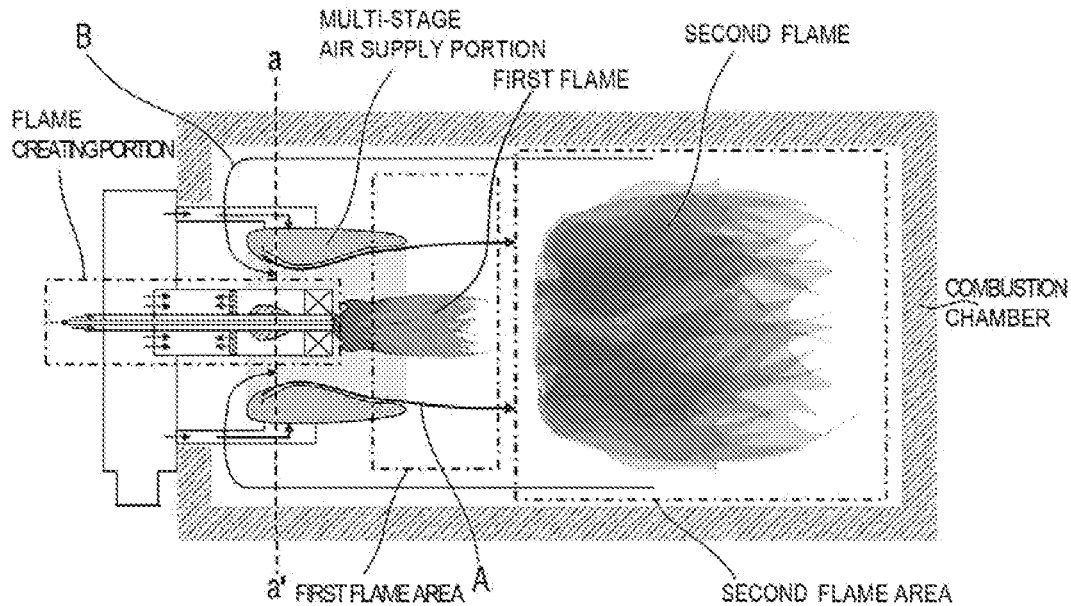
PRIOR ART 3
[FIG. 4]
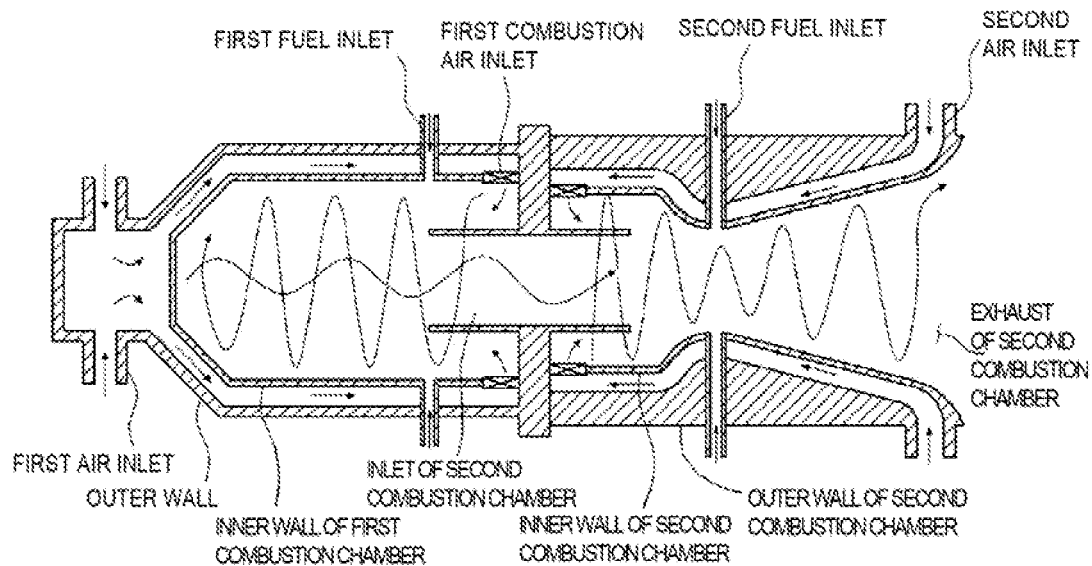
PRIOR ART 4

[FIG. 5]
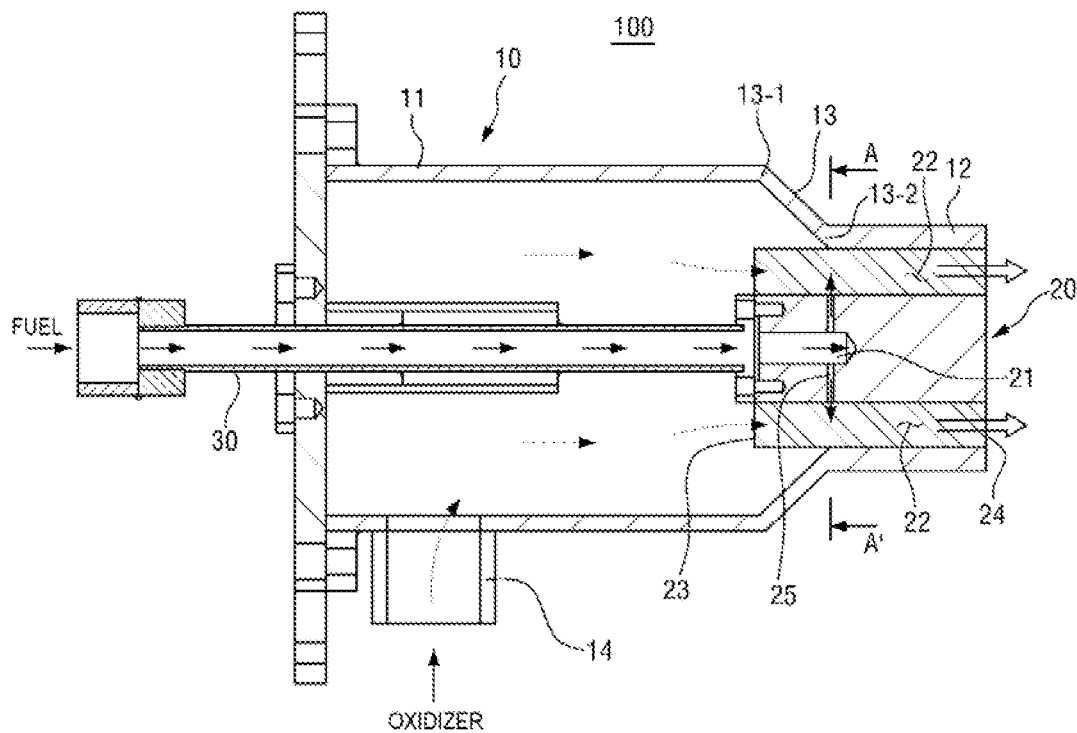
PRIOR ART 5
[FIG. 6]
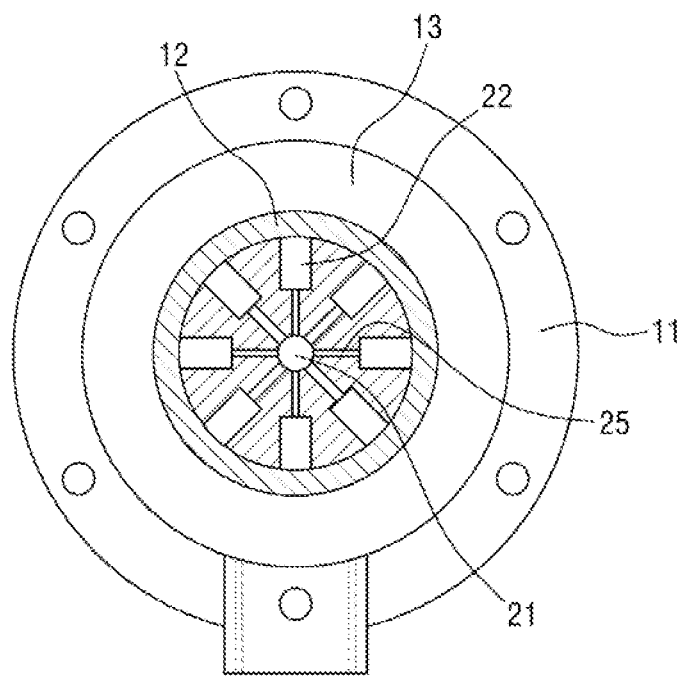
PRIOR ART 5

[FIG. 7]
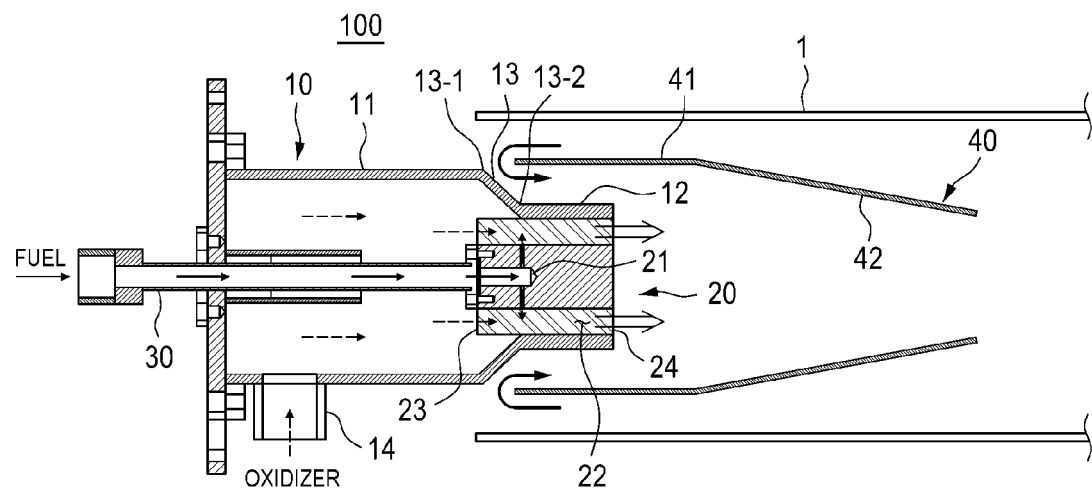
[FIG. 8]
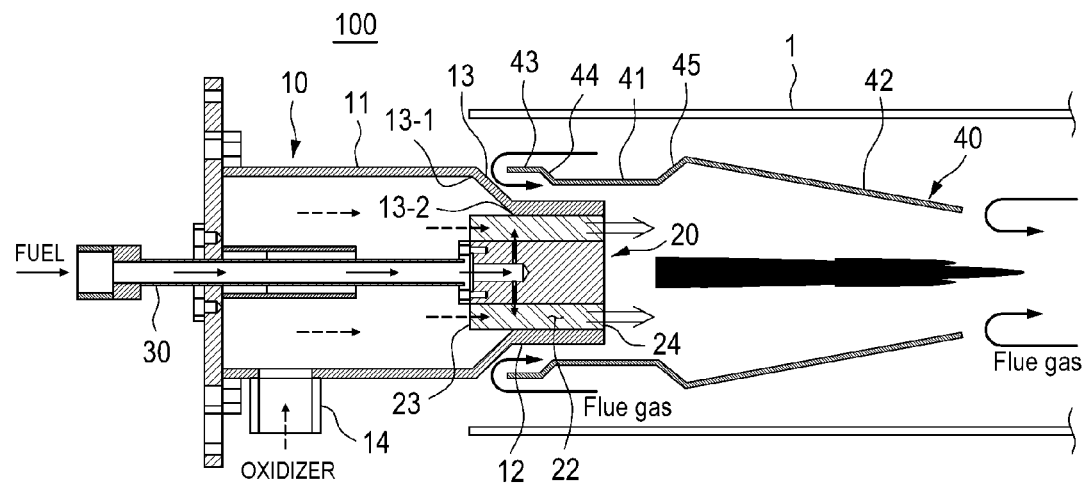

[FIG. 9]
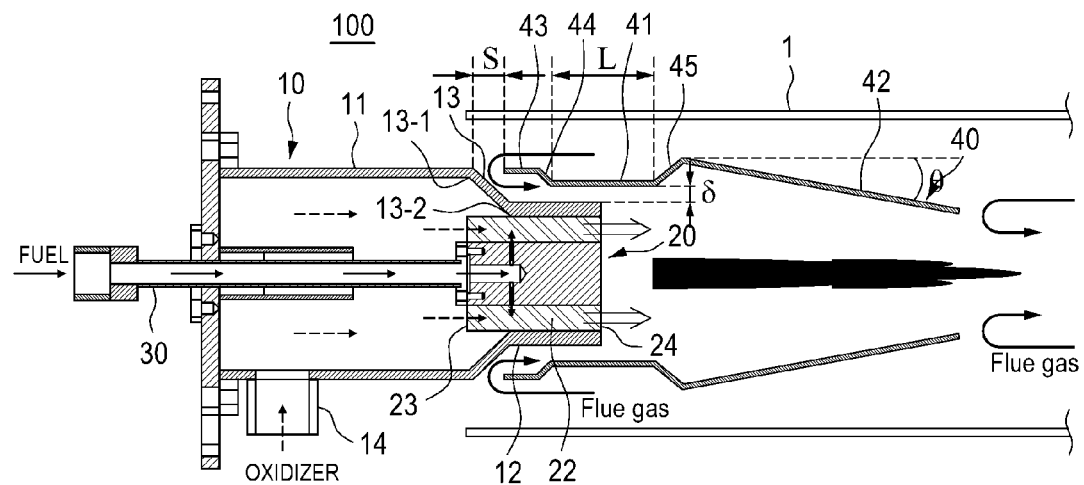

INDUSTRIAL PREMIXED GAS COMBUSTOR USING INTERNAL EXHAUST GAS RECIRCULATION AND OPERATING METHOD THEREOF

CROSS REFERENCE TO RELATED APPLICATIONS

This application is the National Phase of PCT International Application No. PCT/KR2022/020182, filed on Dec. 13, 2022, which claims priority under 35 U.S.C. 119 (a) to Patent Application No. 10-2021-0185429, filed in the Republic of Korea on Dec. 22, 2021, all of which are hereby expressly incorporated by reference into the present application.

BACKGROUND

Technical Field

The present disclosure relates to an industrial premixed gas combustor using internal exhaust gas recirculation and operating method thereof.

Related Art

Conventionally, in general, combustors have been widely used in a variety of fields such as thermal power plants, waste incineration furnaces, gasification furnaces, reformers and heaters for fuel cells, and gas turbines.

Due to the problems of energy depletion and environmental pollution, recently, high-efficiency, low-emission combustion in combustion systems has become essential. To achieve this, research on improving the performance of burners and research on combustion control for improving operating methods are being actively conducted.

Existing representative low-emission combustion techniques include multi-stage fuel technology, multi-stage air technology, combustion gas recirculation technology, combustion gas internal recirculation technology, re-combustion technology, and OFA technology. However, these combustion techniques have disadvantages in that additional external devices or peripheral devices having complex structures are required, and there are limitations to low-emission. Therefore, recently, combustion technology that integrates and optimizes multiple low-emission combustion techniques is being researched and developed to overcome the aforementioned disadvantages.

Prior art patent application publication No. 10-2016-0144975 (Prior Art 1) relates to a burner. As shown in FIG. 1, in the burner where MILD combustion occurs, this describes a burner comprising a system for directly sucking recirculated combustion gases from a combustion chamber through an emitter to which an auxiliary combustion agents, a heat exchanger system for heat exchange between recirculated combustion gases and auxiliary agents, and a system for injecting fuel into recirculated combustion gases with or without auxiliary combustion agents. The burner that includes the formation of a mixture of fuel-recirculated combustion gases in the area around the outlet of an auxiliary combustion agent emitter, followed by the introduction of this mixture into the combustion chamber.

Further, prior art patent application publication No. 10-2017-0003052 (Prior Art 2) relates to a burner. As shown in FIG. 2, this describes a gas turbine combustor comprising at least one combustion nozzle, combustion nozzle guides provided at each top of the combustion nozzles, an end cover provided at the top of the combustion nozzle guides, a premix nozzle into which each of the combustion nozzles is inserted, a tube plate including the opening of the premix nozzle and a cap that encloses the outer surface of the tube plate. The cap includes at least one hole.

Further, prior art patent No. 10-1738946 (Prior Art 3) creates a flame by optimizing flame separation technology, multi-stage air technology, fuel partial premixing technology and fuel gas recirculation technology. This describes a combustor with excellent performance for high-efficiency, low-emission combustion. This prior ultra-low-emission combustor, as shown in FIG. 3, comprises a flame generating portion for generating a first flame; and a multi-stage air supply portion into which a part of the flame generating portion is introduced and which supplies combustion gases or air to the area of a second flame that is inside a combustion chamber.

Further, prior patent application publication No. 10-2017-0047869 (Prior Art 4) relates to a combustor. As shown in FIG. 4, this describes an ultra-low-NOx combustor using multi-stage combustion. The ultra-low-NOx combustor is configured with a multi-stage combustion technique that improves the mixing characteristics of a single combustor selectively performing rich burn and lean burn, and thus reduces the generation of pollutants including NOx. Further, it is configured to achieve the same effect as exhaust Fuel Gas Recirculation (hereinafter referred to as FGR) without separate elements for FGR, and thus further reduces pollutants such as NOx compared to conventional combustion techniques and forms the shape of one combustion chamber among at least two combustion chambers into a venture shape. Yet further, it is configured to improve the mixing characteristics and ease of application by improving the combustor structure to give a turn to the air inlet.

However, in the case of prior industrial combustors with independent direct injection or coaxial nozzle structures for fuel and oxidizer, the mixing characteristics of fuel and oxidizer are determined based on operating combustion load (fuel quantity) and air ratio (air quantity). Therefore, there is an issue that requires a separate control device for controlling the position or injection angle of injection nozzles, or injection momentum based on the nozzles, in order to control the mixing characteristics of fuel and oxidizer.

In addition, in the case of prior industrial combustors using swirl vanes (vortex generating blades) to ensure flame stability, the mixing characteristics of fuel and oxidizer are also determined based on operating combustion load (fuel quantity) and air ratio (air quantity). Therefore, there is an issue that requires a control device for controlling the angle of the swirl vane or the axial position (injection position) of the fuel injection tube, in order to control the mixing characteristics of fuel and oxidizer. Accordingly, the prior industrial combustors have a very limited range of operating conditions for controlling combustion characteristics, which is a disadvantage.

In order to address these issues, the inventors of the present application proposed an industrial fuel-rich-lean premixed gas combustor (Patent No. 10-2014828). FIG. 5 is a cross-sectional view of the industrial fuel-rich-lean premixed gas combustor according to Prior Art 5, and FIG. 6 is cross-sectional view along A-A of FIG. 5.

As shown in FIG. 5 and FIG. 6, it is seen that the industrial fuel-rich-lean premixed gas combustor comprises an oxidizer supply chamber 10, an injection block 20 and a fuel injection orifice 25. The oxidizer supply chamber 10 is provided with an oxidizer chamber where oxidizers are supplied, an output end 12 that is open at one end and has a smaller inner diameter than the chamber, and a throttling portion 12 with a gradually decreasing inner diameter.

The injection block 20 is configured to surround the output end 12 of the oxidizer supply chamber 10, and has a plurality of injection channels 22 where oxidizers are introduced from the oxidizer supply chamber 10 and fuel and the oxidizers are mixed and injected. Further, the orifice 25 is provided in-between a fuel chamber 21 of the injection block 20 and each of the injection channels 22 and injects the fuel inside the fuel chamber 21 to the injection channels 22.

This industrial fuel-rich-lean premixed gas combustor can control combustion characteristics (flame shape/emissions) under operating conditions of constant combustion load and air ratio, and it can form a multi-stage fuel-rich-lean premixed gas in the radial direction of the outlet of the combustor. Further, additional oxygen is injected as an oxidizer to adjust the spatial oxygen concentration, thereby adjusting the flame shape and flame temperature. The oxidizer supply chamber having the throttling portion and the injection block having a plurality of injection channels (linear- or spiral type), and a single or a plurality of orifices for fuel injection inside the injection channels are formed to vary the diameter, cross-section, shape and number of the orifices for fuel injection depending on the injection channels, thereby securing radial multi-stage premixing effects and characteristics at the outlet end of the injection block by fuel-rich or -lean injection depending on the injection channel according to the fuel injection quantity difference.

The implementation of the nitrogen oxide total quantity control system will result in serious environmental costs when the instantaneous concentration of nitrogen oxides emitted from facilities, as well as the total annual emissions thereof, exceed the quota.

As a result, the application of post-treatment facilities such as SCR facilities has expanded in the field of steel industries. However, in order to respond to the strengthened environmental regulations, low-NOx emission characteristics of the combustion system itself are becoming increasing important.

The main performance indicators of the radiant tube heating system includes turndown ratio, surface temperature uniformity, and NOx.

When the industrial fuel-rich-lean premixed gas combustor according to the Prior Art 5 (Patent No. 10-2014828) is applied to the radiant tube heating system of a heat treatment furnace, there may be a burn out risk of the radiant tube by local heating due to the improvement of fuel-oxidizer mixing performance.

DETAILED DESCRIPTION

Technical Problem

Therefore, the present disclosure is contrived to address conventional issues as described above. According to the embodiment of the present disclosure, it aims to provide an industrial premixed gas combustor using internal exhaust gas recirculation and an operating method thereof in order to address the risk of burn out risk of the radiant tube by local heating due to the improvement of fuel-oxidizer mixing performance when applying to the radiant tube heating system of a heat treatment furnace. Wherein, a portion of the combustion gas is recirculated inside a radiant tube again, thereby lowering the flame temperature, the internal combustion gas is introduced, thereby reducing the concentration of nitrogen oxides, the ratio of the internal recirculation gas is adjusted by optimizing the shape of internal recirculation tube, such as S, L, δ and θ, thereby improving the surface uniformity of the radiant tube, and the flame discharge speed at the outlet end is adjusted by adjusting the angle (θ) of the outlet throttling portion of the internal recirculation tube to improve the exhaust gas mixing by secondary recirculation of the surrounding flow, thereby improving the temperature uniformity of the radiant tube.

Meanwhile, technical objects to be achieved in the present invention are not limited to the aforementioned technical objects, and other technical objects, which are not mentioned above, will be apparently understood to a person having ordinary skill in the art from the following description.

Technical Solution

According to a first aspect of the present disclosure, it can be achieved by an industrial premixed gas combustor using internal exhaust gas recirculation. The industrial premixed gas combustor may include: an oxidizer supply chamber provided with an oxidizer chamber where oxidizers are supplied, an output end that is open at one end and has a smaller inner diameter than the chamber, and a throttling portion with a gradually decreasing inner diameter in-between the oxidizer chamber and the output end; an injection block configured to be surrounded with the output end of the surround the oxidizer supply chamber, and having a fuel chamber that is provided in the central part of the interior and is supplied with fuel, and a plurality of injection channels where oxidizers are introduced from the oxidizer supply chamber and fuel and the oxidizers are mixed and injected; an orifice for fuel injection provided in-between the fuel chamber of the injection block and each of the injection channels, and injecting fuel inside the fuel chamber to the injection block; and an internal recirculation tube formed to be spaced apart from the outer surface of the output end of the oxidizer supply chamber at a predetermined interval and to extend toward the outlet, and recirculating exhaust gas due to combustion.

According to another aspect of the present disclosure, the industrial premixed gas combustor using internal exhaust gas recirculation may be characterized in that flame is created by the injection channels, and the exhaust gas due to combustion is recirculated and output through a spaced space between the internal recirculation tube and the output end.

According to yet another aspect of the present disclosure, the industrial premixed gas combustor using internal exhaust gas recirculation may be characterized in that the industrial gas combustor is installed in an internal space for heating a radiant tube and the exhaust gas is recirculated to the internal recirculation tube by a differential pressure in the radiant tube.

According to yet another aspect of the present disclosure, the industrial premixed gas combustor using internal exhaust gas recirculation may be characterized in that the exhaust gas recirculated inside the internal recirculation tube increases the temperature uniformity of the radiant tube, lowers the flame temperature inside the radiant tube, and reduces the concentration of NOx.

According to yet another aspect of the present disclosure, the industrial premixed gas combustor using internal exhaust gas recirculation may be characterized in that the internal recirculation tube has a body portion that is spaced apart from the outer surface of the output end at a predetermined interval and extends with a constant inner diameter, and an outlet throttling portion that is connected with the front end of the body portion with an inner diameter gradually reduced toward the front side.

According to yet another aspect of the present disclosure, the industrial premixed gas combustor using internal exhaust gas recirculation may be characterized in that the internal recirculation tube includes a rear end portion that is provided at the rear side of the body portion wherein an inner diameter is larger than that of the body portion and a rear end surface is spaced apart from an inlet end of the throttling portion of the oxidizer supply chamber at a predetermined interval, a rear throttling end that is provided in-between the rear end portion and the body portion with a gradually reduced inner diameter, and an expanded end that is provided in-between an outlet throttling portion and the body portion with a gradually reduced inner diameter.

According to yet another aspect of the present disclosure, the industrial premixed gas combustor using internal exhaust gas recirculation may be characterized in that the flame discharge speed is controlled by adjusting the angle of the outlet throttling portion to improve the exhaust gas mixing by secondary recirculation of the surrounding flow, thereby improving the temperature uniformity of the radiant tube.

According to yet another aspect of the present disclosure, the industrial premixed gas combustor using internal exhaust gas recirculation may be characterized in that the recirculation amount of exhaust gas to be recirculated to the internal recirculation tube is adjusted by adjusting the predetermined interval, the length of the body portion and the spacing distance between the inner surface of the body portion and the outer surface of the output end.

According to yet another aspect of the present disclosure, the industrial premixed gas combustor using internal exhaust gas recirculation may be characterized by further including a moving unit that moves the injection block in the longitudinal direction and adjusts the axial relative position of the injection block in the throttling portion.

According to a second aspect of the present disclosure, it can be achieved by an operating method of an industrial premixed gas combustor using internal exhaust gas recirculation may include steps of: supplying oxidizers to the inside of an oxidizer supply chamber, and fuel to a fuel chamber that is provided in the central part of the interior of an injection block surrounded with an output end of the oxidizer supply chamber; introducing oxidizers of the oxidizer supply chamber to a plurality of inlet ends of injection channels, in a throttling portion where a diameter between oxidizer chamber supplied with oxidizer inside and an output end is gradually reduced; injecting fuel inside the fuel chamber to respective injection channels through a plurality of orifices for fuel injection provided in-between the fuel chamber of the injection block and each of the injection channels and mixing the fuel and the oxidizers; mixing and injecting the fuel and oxidizers through a discharge end of each of the injection channels; and recirculating exhaust gas due to combustion through an internal recirculation tube that is formed to be spaced apart from the outer surface of the output end of the oxidizer supply chamber at a predetermined interval and to extend toward an outlet, wherein the internal recirculation tube has a body portion that is spaced apart from the outer surface of the output end at a predetermined interval and extends with a constant inner diameter, and an outlet throttling portion that is connected with the front end of the body portion with an inner diameter gradually reduced toward the front side, and the exhaust gas is recirculated and output to the interior of the internal recirculation tube by a differential pressure in the radiant tube.

Advantageous Effects

According to an industrial premixed gas combustor using internal exhaust gas recirculation and an operating method thereof in accordance of the embodiment of the present disclosure, it is capable of address the risk of burn out risk of the radiant tube by local heating due to the improvement of fuel-oxidizer mixing performance when applying to the radiant tube heating system of a heat treatment furnace. Wherein, a portion of the combustion gas is recirculated inside a radiant tube again, thereby lowering the flame temperature, the internal combustion gas is introduced, thereby reducing the concentration of nitrogen oxides, the ratio of the internal recirculation gas is adjusted by optimizing the shape of internal recirculation tube, such as S, L, δ and θ, thereby improving the surface uniformity of the radiant tube, and the flame discharge speed at the outlet end is adjusted by adjusting the angle (θ) of the outlet throttling portion of the internal recirculation tube to improve the exhaust gas mixing by secondary recirculation of the surrounding flow, thereby improving the temperature uniformity of the radiant tube.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings;

FIG. 1 is a perspective view showing circulation of auxiliary combustion agent in a burner according to the Prior Art 1, FIG. 2 shows an combustor of a gas turbine according to the Prior Art 2 and the configuration of the combustor, FIG. 3 is a cross-sectional view of a combustor from the side according to the Prior Art 3, FIG. 4 is a schematic view showing the specific configuration and internal flow of an ultra-low-NOx combustor using multi-stage combustion according to the Prior Art 4, FIG. 5 is a cross-sectional view of the industrial fuel-rich-lean premixed gas combustor according to Prior Art 5, FIG. 6 is cross-sectional view along A-A of FIG. 5, and FIG. 7 to FIG. 9 show cross-sectional views of an industrial premixed gas combustor using internal exhaust gas recirculation according to the present disclosure.

REFERENCE NUMBERS

10: oxidizer supply chamber
11: oxidizer chamber
12: output end
13: throttling portion
13-1: inlet end
13-2: outlet end
20: injection block 21: fuel chamber
22: injection channel
23: inlet end of injection channel
24: discharge end of injection channel
25: orifice for fuel injection
30: fuel supply tube
40: internal recirculation tube
41: body portion
42: outlet throttling portion
43: rear end portion 44: rear throttling end
45: expanded end
100: industrial premixed gas combustor using internal exhaust gas recirculation

BEST MODE

Hereinafter, described are the configuration and of an industrial premixed gas combustor using internal exhaust gas recirculation according to the embodiment of the present disclosure as well as an operating method thereof.

FIG. 7 to FIG. 9 show cross-sectional views of an industrial premixed gas combustor using internal exhaust gas recirculation according to the present disclosure.

A shown in FIG. 7 to FIG. 9, it is seen that an industrial premixed gas combustor using internal exhaust gas recirculation 100 according to the embodiment of the present disclosure is configured to include an oxidizer supply chamber 10, an injection block 20, a fuel supply tube 30, an orifice for fuel injection 25, an internal recirculation tube 40, etc.

An oxidizer supply chamber 10 constitutes a housing of the entire industrial gas combustor 100, including an oxidizer chamber 11, a throttling portion 13 and an output end 12. Oxidizers are supplied to the inside of an oxidizer chamber 11 is supplied through an oxidizer supply end 14, and the output end 12 is provided on one side of the oxidizer supply chamber 10, which has a tube shape and is open at the end.

Further, the diameter of the oxidizer chamber 11 is configured to be larger than that of the output end 12. As shown in FIG. 7 to FIG. 9, it is seen that the throttling portion 13 is provided in-between the oxidizer chamber 11 and the output end 12, which has a diameter gradually reduced toward one side direction, that is, from an inlet end 13-1 to outlet end 13-2.

As shown in FIG. 5 and FIG. 6, it is seen that an injection block 20 is configured that a part thereof surrounds the output end 12 of the oxidizer supply chamber 10, and has a cylindrical shape overall.

A fuel chamber 21 is provided in the internal central part of the other side of the injection block 20 and fuel is supplied, and a plurality of injection channels 22 are provided to be spaced apart from each other at a predetermined interval on the outer surface in the radial direction. The oxidizers of the oxidizer supply chamber 10 is introduced into an inlet end 23 of the injection channel 22, and the fuel and oxidizers are mixed and injected through a discharge end 24 of the injection channel 22.

A fuel supply tube 30 penetrates the other side of the oxidizer chamber 11, and one end is detachably connected to the fuel chamber 21 side of the injection block 20 through a mounting end 31. Accordingly, the fuel introduced into the other end if the fuel supply tube 30 is supplied to the fuel chamber 21 of the injection block 20 through the fuel supply tube 30.

Further, an orifice 25 for fuel injection is provided in-between this fuel chamber 21 of the injection block 20 and each of the injection channels 22 and the fuel inside the fuel chamber 21 is injected to the injection channel 22.

These injection channels 22 have a groove shape that is concave from the outer surface to the inner surface of the injection block 30. These are arranged to be spaced apart from each other at a predetermined interval in the radial direction and the longitudinal direction thereof is formed in a linear- or spiral type.

DESCRIPTION OF EMBODIMENTS

Further, the width and length of each of the plurality of injection channels 22 may be formed differently depending on the design flow rate of the oxidizer.

The orifice for fuel injection 25 is formed between the fuel chamber 21 and the width-wise center of the injection channel 22, and the cross-sectional shape may be circular, oval or square, etc.

This orifice for fuel injection 25 may be configured with a different number, cross-sectional area and cross-sectional shape in each of the injection channels 22, based on the mixed fuel concentration (fuel-rich, fuel-lean) designed in each of the injection channels 22.

Further, radial fuel-oxidizer mixing characteristics (mixing ratio) can be varied in the throttling portion 13 according to the axial relative position of the injection block 20 (the axial position of the orifice for fuel injection 25) by a moving unit.

That is, through this configuration, the fuel-oxidizer mixed gas, which has a different mixing concentration in the radial direction in the throttling portion 10 of the oxidizer supply chamber 10, is divided into the injection channels 22 formed in the cylindrical injection block 20, the mixed gas with a specific fuel concentration is injected in the radial direction of the discharge end of the cylindrical injection block 30 through the injection channels 22, and different combustion characteristics can be implemented by ignition and mixing, or mixing and ignition between mixed gases of the injection channels 22 adjacent to each other.

When this industrial premixed gas combustor is applied to radiant tube heating, there is the disadvantage that the flame may be not strong due to excessive mixing, and local heating rather than uniform heating of the radiant tube may occur.

The main performance indicators of the radiant tube heating system includes turndown ratio, surface temperature uniformity, and NOx. In the embodiment of the present disclosure, when applied to the radiant tube heating system of a heating treatment furnace, the internal recirculation tube 40 is included to prevent a burn out risk of the radiant tube by local heating due to the improvement of fuel-oxidizer mixing performance.

The internal recirculation tube 40 according to the embodiment of the present disclosure is formed to be spaced apart from the outer surface of the output end 12 of the oxidizer supply chamber 10 at a predetermined interval and to extend toward an outlet, and thus is configured to recirculate exhaust gas due to combustion.

That is, flame is created by the injection channels 22, and the exhaust gas due to combustion is recirculated and output through a spaced space between the internal recirculation tube 40 and the output end 12.

Further, the exhaust gas is recirculated and output to the inside through the internal recirculation tube 40 and the exhaust gas mixing is improved by secondary recirculation of the surrounding flow, thereby improving the temperature uniformity of the radiant tube at the same time.

That is, the industrial gas combustor according to the embodiment of the present disclosure is installed in the internal space of the radiant tube for heating the radiant tube, and the exhaust gas is recirculated to the internal recirculation tube by a differential pressure in the radiant tube.

The exhaust gas is recirculated inside the internal recirculation tube 40 according to the embodiment of the present disclosure to increase the temperature uniformity of a radiant tube 1, lower the flame temperature inside the radiant tube 1, and reduce the concentration of NOx.

As seen in FIG. 7, it is seen that the internal recirculation tube 40 according the embodiment of the present disclosure a body portion 41 that is spaced apart from the outer surface of the output end 12 at a predetermined interval and extends with a constant inner diameter, and an outlet throttling portion 42 that is connected with the front end of the body portion 41 with an inner diameter gradually reduced toward the front side.

More particularly, as shown in FIG. 8 and FIG. 9, it is seen that the internal recirculation tube 40 according to the embodiment of the present disclosure is configured to include a rear end portion 43, a rear throttling end 44, and the body portion 1, an expanded end 45 and the outlet throttling portion 42.

The rear end portion 43 is provided at a rear side of a body portion 41 wherein an inner diameter is larger than that of the body portion 41 and a rear end surface is spaced apart from an inlet end 13-1 of the throttling portion of the oxidizer supply chamber 10 at a predetermined interval S. Accordingly, the exhaust gas is recirculated and introduced into the inside through the predetermined interval S between the rear end surface and inlet end 13-1 of the throttling portion of the rear end portion 43. That is, the recirculation amount of exhaust gas to be introduced to the internal recirculation tube can be adjusted by adjusting this predetermined interval S.

The rear throttling end 44 that is provided in-between the rear end portion 43 and the body portion 41 with a gradually reduced inner diameter. In addition, an expanded end 45 is provided in-between the outlet throttling portion 42 and the body portion 41 with a gradually reduced inner diameter.

According to the embodiment of the present disclosure, the flame discharge speed is controlled by adjusting the angle ($\theta$) and length of the outlet throttling portion to improve the exhaust gas mixing by secondary recirculation of the surrounding flow, thereby improving the temperature uniformity of the radiant tube.

The recirculation amount of the exhaust gas to be recirculated inside can be adjusted by adjusting the predetermined interval S, the length L of the body portion, and a spacing distance $\delta$ between the inner surface of the body portion and the outer surface of the output end.

Therefore, as mentioned above, according to the industrial premixed gas combustor using internal exhaust gas recirculation and the operating method thereof, it is capable of address the risk of burn out risk of the radiant tube by local heating due to the improvement of fuel-oxidizer mixing performance when applying to the radiant tube heating system of a heat treatment furnace. Wherein, a portion of the combustion gas is recirculated inside a radiant tube again, thereby lowering the flame temperature, the internal combustion gas is introduced, thereby reducing the concentration of nitrogen oxides, the ratio of the internal recirculation gas is adjusted by optimizing the shape of internal recirculation tube, such as S, L, $\delta$ and $\theta$, thereby improving the surface uniformity of the radiant tube, and the flame discharge speed at the outlet end is adjusted by adjusting the angle ($\theta$) of the outlet throttling portion of the internal recirculation tube to improve the exhaust gas mixing by secondary recirculation of the surrounding flow, thereby improving the temperature uniformity of the radiant tube.

The invention claimed is:

1. An industrial premixed gas combustor using internal exhaust gas recirculation, the industrial premixed gas combustor comprising:
    an oxidizer supply chamber provided with an oxidizer chamber where oxidizers are supplied, an output end that is open at one end and has a smaller inner diameter than an inner diameter of the oxidizer chamber, and a throttling portion with a gradually decreasing inner diameter in-between the oxidizer chamber and the output end;
    an injection block configured to be surrounded with the output end of the oxidizer supply chamber, and having a fuel chamber that is provided in a central part of an interior of the fuel chamber and is supplied with fuel and a plurality of injection channels where the oxidizers are introduced from the oxidizer supply chamber and the fuel and the oxidizers are mixed and injected;
    an orifice for fuel injection provided in-between the fuel chamber of the injection block and each of the injection channels, and injecting the fuel inside the fuel chamber to the injection block; and
    an internal recirculation tube formed to be spaced apart from an outer surface of the output end of the oxidizer supply chamber at a predetermined interval and to extend toward an outlet, and recirculating exhaust gas due to combustion,
    wherein flame is created by the injection channels, and the exhaust gas due to combustion is recirculated and output through a spaced space between the internal recirculation tube and the output end,
    wherein the industrial premixed gas combustor is installed in an internal space of a radiant tube for heating the radiant tube and the exhaust gas is recirculated to the internal recirculation tube by a differential pressure in the radiant tube,
    wherein the exhaust gas recirculated inside the internal recirculation tube increases a temperature uniformity of the radiant tube, lowers a flame temperature inside the radiant tube, and reduces a concentration of Nox, and
    wherein the internal recirculation tube has a body portion that is spaced apart from the outer surface of the output end at a predetermined interval and extends with a constant inner diameter, and an outlet throttling portion that is connected with a front end of the body portion with an inner diameter of the outlet throttling portion gradually reduced toward a front side.

2. The industrial premixed gas combustor of claim 1, wherein
    the internal recirculation tube includes a rear end portion at a rear side of the body portion wherein an inner diameter of the rear end portion is larger than the inner diameter of the body portion and a rear end surface is spaced apart from an inlet end of the throttling portion of the oxidizer supply chamber at a predetermined interval, a rear throttling end that is provided in-between the rear end portion and the body portion with a gradually reduced inner diameter of the rear throttling end, and an expanded end that is provided in-between the outlet throttling portion and the body portion with a gradually increased inner diameter of the expanded end.

3. The industrial premixed gas combustor-using internal exhaust gas of claim 2, wherein
a flame discharge speed is controlled by adjusting an angle of the outlet throttling portion to improve an exhaust gas mixing by secondary recirculation of a surrounding flow, thereby improving the temperature uniformity of the radiant tube.

4. The industrial premixed gas combustor of claim 3, wherein
a recirculation amount of exhaust gas to be recirculated to the internal recirculation tube is adjusted by adjusting the predetermined interval between the body portion and the outer surface of the output end, a length of the body portion and a spacing distance between an inner surface of the body portion and the outer surface of the output end.

5. The industrial premixed gas combustor of claim 1, further comprising:
a moving unit that moves the injection block in a longitudinal direction and adjusts an axial relative position of the injection block in the throttling portion.

6. An operating method of an industrial premixed gas combustor using internal exhaust gas recirculation, the operating method comprising:
supplying oxidizers to an inside of an oxidizer supply chamber, and fuel to a fuel chamber that is provided in a central part of an interior of an injection block surrounded with an output end of the oxidizer supply chamber;
introducing the oxidizers of the oxidizer supply chamber to a plurality of inlet ends of injection channels, in a throttling portion where a diameter between an oxidizer chamber supplied with the oxidizers inside and an output end is gradually reduced;
injecting the fuel inside the fuel chamber to respective injection channels through a plurality of orifices for fuel injection provided in-between the fuel chamber of the injection block and each of the injection channels and mixing the fuel and the oxidizers;
mixing and injecting the fuel and the oxidizers through a discharge end of each of the injection channels; and
recirculating exhaust gas due to combustion through an internal recirculation tube that is formed to be spaced apart from an outer surface of the output end of the oxidizer supply chamber at a predetermined interval and to extend toward an outlet, wherein
the internal recirculation tube includes a body portion that is spaced apart from the outer surface of the output end at a predetermined interval and extends with a constant inner diameter, and an outlet throttling portion that is connected with a front end of the body portion with an inner diameter gradually reduced toward a front side, and the exhaust gas is recirculated and output to an interior of the internal recirculation tube by a differential pressure in a radiant tube.

7. An industrial premixed gas combustor using internal exhaust gas recirculation, the industrial premixed gas combustor comprising:
an oxidizer supply chamber provided with an oxidizer chamber where oxidizers are supplied, an output end that is open at one end and has a smaller inner diameter than an inner diameter of the oxidizer chamber, and a throttling portion with a gradually decreasing inner diameter in-between the oxidizer chamber and the output end;
an injection block configured to be surrounded with the output end of the oxidizer supply chamber, and having a fuel chamber that is provided in a central part of an interior of the fuel chamber and is supplied with fuel and a plurality of injection channels where the oxidizers are introduced from the oxidizer supply chamber and the fuel and the oxidizers are mixed and injected;
an orifice for fuel injection provided in-between the fuel chamber of the injection block and each of the injection channels, and injecting the fuel inside the fuel chamber to the injection block; and
an internal recirculation tube formed to be spaced apart from an outer surface of the output end of the oxidizer supply chamber at a predetermined interval and to extend toward an outlet, and recirculating exhaust gas due to combustion,
wherein the internal recirculation tube has a body portion that is spaced apart from the outer surface of the output end at a predetermined interval and extends with a constant inner diameter, and an outlet throttling portion that is connected with a front end of the body portion with an inner diameter of the outlet throttling portion gradually reduced toward a front side.

* * * * *